Oct. 1, 1935.  A. PULZ  2,015,869
SUPPORT FOR PORTABLE OPTICAL INSTRUMENTS
Filed Nov. 25, 1933
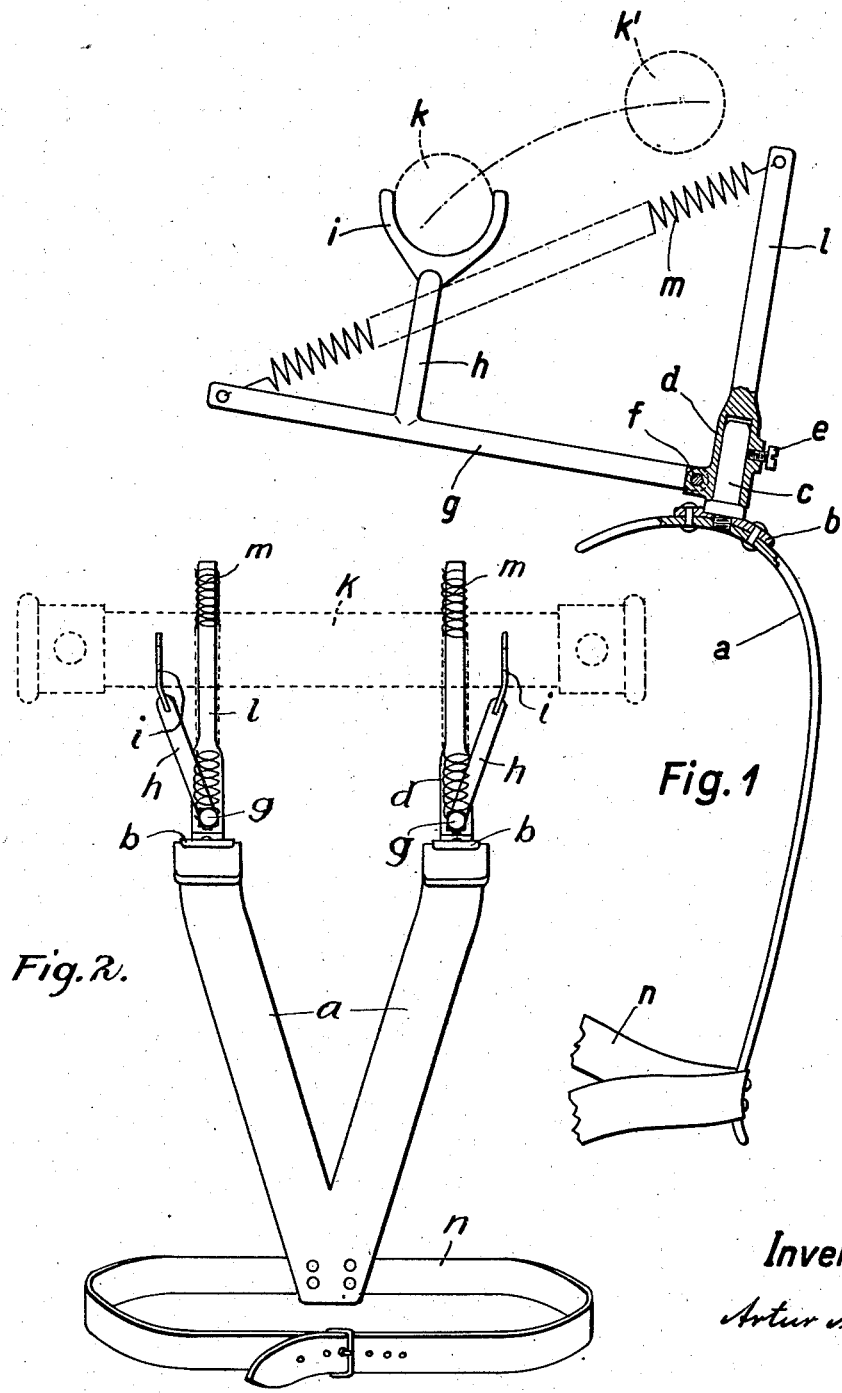

Patented Oct. 1, 1935

2,015,869

UNITED STATES PATENT OFFICE 2,015,869

SUPPORT FOR PORTABLE OPTICAL INSTRUMENTS

Artur Pulz, Jena, Germany, assignor to firm Carl Zeiss, Jena, Germany

Application November 25, 1933, Serial No. 699,682
In Germany November 26, 1932

3 Claims. (Cl. 88—1)

I have filed applications in Germany, November 26, 1932, and Italy, April 4, 1933.

The invention relates to supports for portable optical instruments, especially rangefinders, other transverse observation or measuring instruments and photographic cameras, which so rest on the body of the person using and observing by means of the instrument that this person's hands are free and may operate the instrument and that the load of the instrument may be sustained for longer spaces of time without any exertion or fatigue worth mentioning. It is desirable that the body of the person carrying the support with the optical instrument may assume a natural attitude and that the instrument may be used in and given different positions without any great efforts having to be made.

The invention aims at attaining the said advantage by providing the support with two curved pieces to be placed on the shoulders of the person using the instrument, to each of which one arm for holding the optical instrument is so attached for rotation about an axis which intersects approximately the neck joint of the user that the optical observation instrument resting on these two arms may be given such positions in front of the observer's eye as are suitable for observing forwardly and upwardly, provision being made that forces of rotation act in a sense reverse to that of the load and approximately compensate for the weight of the instrument. In an especially practical and convenient construction of the support, the forces of rotation are caused by draw springs whose one ends are attached to the exterior parts of the said arms and whose other ends are attached to rods rigidly connected to the said shoulder pieces. To avoid any possibility of displacing the support on the observer's body when one position for use of the optical instrument is changed for another and to prevent the support from gliding away from the observer's shoulders, it is advisable to so construct the shoulder pieces that they extend over the entire length of and may be attached to the observer's back. This attachment is effected by means of a belt or the like.

In the accompanying drawing, Figure 1 represents a constructional example of the invention in part-sectional elevation, and Figure 2 illustrates a front view of the example.

The constructional example is a support for portable rangefinders. This support has two shoulder pieces $a$ which are made to conform to the observer's back and which are connected to each other at their lower ends. The shoulder parts of the pieces $a$ are strengthened by plates $b$. Into the plates $b$ are screwed bolts $c$ to which sleeves $d$ are attached by means of screws $e$. The sleeves $d$ are provided with joints $f$ about which arms $g$ may rotate. The arms $g$ are provided with lateral extensions $h$ supporting bearings $i$ for the rangefinder $k$. Between the ends of the arms $g$ and those of the rods $l$ attached to the sleeves $d$ are provided draw-springs $m$ having such a strength as to compensate approximately for the weight of that part of the support which extends forwardly and for the weight of the rangefinder placed on the said part. To the lower ends of the shoulder pieces $a$ is fixed a belt $n$ for attaching the support to the observer's back.

When the instrument is in use, the support is so placed on the observer's shoulders that the interconnected ends of the shoulder pieces $a$ lie against and are secured by a belt $n$ to the observer's back. The rangefinder $k$ is placed in the bearings $i$, in which it may be rotated at will about its longitudinal axis. By rotating the arms $g$ about the joints $f$, the rangefinder $k$ may be adjusted according to the height of the object to be measured. It may be given, for instance, the position $k'$, the observer having to incline his head rearwardly. The springs $m$ hold the rangefinder $k$ in any desired position for use, and the observer may easily operate the adjusting and measuring organs of the rangefinder. The belt $n$ prevents the support from gliding down from the observer's shoulders when the rangefinder assumes positions in which the centre of gravity of the support and the optical instrument lies in front of the observer's shoulders.

I claim:

1. A support for portable optical instruments, comprising two curved pieces adapted to be placed on the shoulders of an observer, two arms extending forwardly, two means for supporting these arms for rotation about an axis approximately intersecting the observer's neck joint, each of these two means being provided on one of the said shoulder pieces, two devices for supporting the two ends of an optical instrument, each of these two devices being connected to one of the said arms, and other means for counteracting the weight of the optical instrument.

2. In a support for portable optical instruments, according to claim 1, the said means for supporting the said arms consisting of two rods extending upwardly, each of these two rods being rigidly connected to one of the said shoulder pieces, each of the said arms being pivotally secured to one of the said rods, the said means for counteracting the weight of the optical instrument consisting of two draw springs, each of these draw springs connecting the upper end of one of the two rods to the outer end of the adjacent arm.

3. In a support for portable optical instruments, according to claim 1, a belt for the observer, this belt being fixed to the two shoulder pieces.

ARTUR PULZ.